Sept. 9, 1969  G. W. COPE ET AL  3,465,900

FRICTION-POLYURETHANE RUBBER DRAFT GEAR

Filed Aug. 30, 1966

Inventors:
Geoffrey W. Cope
Fred G. Suckow

By Wilmer Mechlin
their Attorney

United States Patent Office 3,465,900
Patented Sept. 9, 1969

3,465,900
FRICTION-POLYURETHANE RUBBER DRAFT GEAR
Geoffrey W. Cope, Williamsville, and Fred G. Suckow, Bowmansville, N.Y., assignors to Symington Wayne Corporation, Depew, N.Y., a corporation of New York
Filed Aug. 30, 1966, Ser. No. 576,079
Int. Cl. B61g 9/06
U.S. Cl. 213—22                                6 Claims

ABSTRACT OF THE DISCLOSURE

A housed friction-polyurethane rubber draft gear having front friction and rear polyurethane rubber cushioning units arranged in tandem, the friction unit including a pair of wedges releasably interlocked at the front with a plunger and urged apart by a polyurethane wedge spring unit, the wedges normally projecting forwardly from and under compression being retractable inside the housing.

---

This invention relates to housed draft gears of the friction-rubber type for railway vehicles.

The increases in recent years in the lengths and speeds of freight trains, the speeds at which freight cars are humped in classification yards and the sizes of such cars, have caused the A.A.R. to upgrade drastically the specifications for draft gears fittable into a standard 24⅝ in. freight car draft gear pocket. The specifications class such draft gears according to whether their travels are 2⅝ in. or 3¼ in., M–901–53 applying to the former and M–901E–62 to the latter. Among draft gears of the housed friction-rubber type, examples of the two classes are found in Blattner Patent No. 2,919,819, issued Jan. 5, 1960, and Suckow Patent No. 3,138,264, issued June 23, 1964, showing gears designed for travels of 2⅝ in. and 3¼ in., respectively.

Reduced to its fundamentals, a draft gear of the housed friction-rubber type has a housing open at an end and containing friction and rubber cushioning units which are arranged in tandem and act in series for cushioning longitudinal buffing and draft forces applied through an adjoining coupler. The capacity of the gear increases with travel and the relative contributions of its units to its capacity at particular travels vary, the friction unit contributing more at initial travel and less at ultimate travel than the rubber unit. In its reaction on release of the applied force, the rubber unit also contributes the longitudinal force primarily depended upon for restoring the gear to its normal expanded condition. As applied to such a draft gear, the term "rubber" is used customarily and herein not as limited to natural rubber but as denoting also a rubberlike elastomer or synthetic, the "rubber" now usually used in prior gears being synthetic GR–S rubber.

The gears of the Blattner and Suckow patents are true to type in the foregoing fundamentals and both were designed to fit into a standard 24⅝ in. length draft gear pocket in a freight car and intended to use as their rubber the usual GR–S synthetic rubber. Using this rubber and with a travel of 2⅝ in., the Blatner gear had no difficulty in obtaining A.A.R. certification under specificatioin M–901–53. The Blattner and Suckow gears have the same basic components, including a front follower connected to the housing, but, by an ingenious change in structure, both the travel and the length of the rubber cushioning unit are increased in the Suckow gear over the Blattner gear within the same overall length and without adversely affecting the capacity of the friction cushioning unit.

As those increases bore directly upon its relative capacity, the Suckow gear, using the same rubber, was expected to meet the applicable A.A.R. specification M–901E–61 without difficulty and this was indicated by the preliminary tests of the prototype menitoned in the introductory portion of the specification of the patent. However, when five such gears were tested officially for A.A.R. certification, they failed to meet the specification. As, without certification, the Suckow gear was of limited usefulness and could not be used in interchange service, an intensive investigation was immediately undertaken to determine the cause, and, if possible, rectify the shortcoming of the tested gears. Unexpectedly, this investigation led to the discovery that no change in the gear's structure was needed and that all that was required to meet the specification was to change the rubber in the rubber cushioning unit from the usual synthetic rubber to polyurethane rubber or elastomer. This was later confirmed in official tests on the basis of which the improved gear was given A.A.R. certification.

The primary object of the invention is to provide an improved friction-rubber draft gear which uses as its rubber polyurethane rubber and, in a form fittable into a 24⅝ in. draft gear pocket and having a travel of 3¼ in., far surpasses the applicable A.A.R. specification.

Another object of the invention is to provide an improved friction-rubber draft gear wherein friction and rubber cushioning units are arranged in tandem in a housing and the resilience in both units is supplied by polyurethane rubber, thereby not only facilitating the assembly of both units and improving their action but enabling the gear to operate effectively over the wide range of climatic conditions to which it is subjectable in service.

Other objects and advantages of the inveniton will appear hereinafter in the detailed description, be particularly pointed out in the appended claims and be illustrated in the accompanying drawings, in which:

Figure 1:
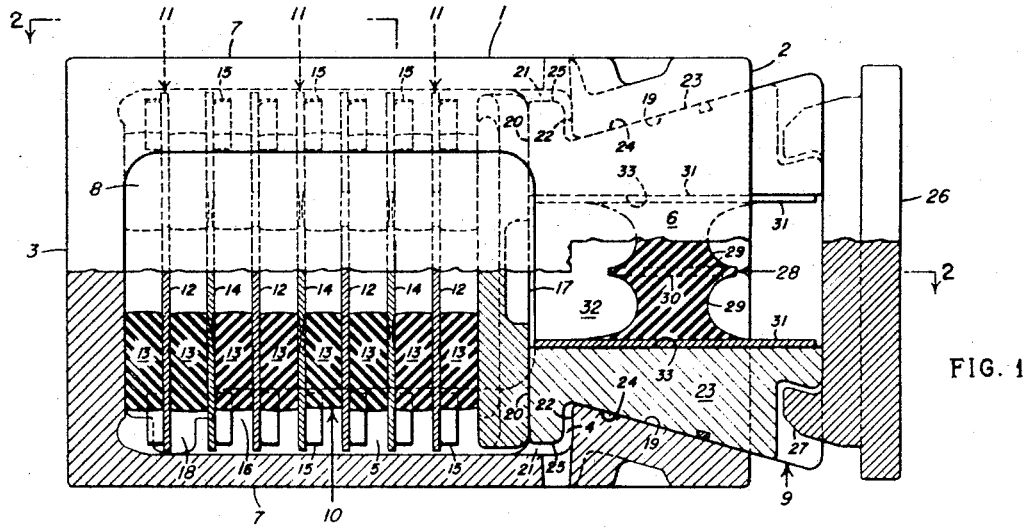
FIGURE 1 is a plan view, partly in horizontal section, of a preferred embodiment of the draft gear of the present invention.
Figure 2:
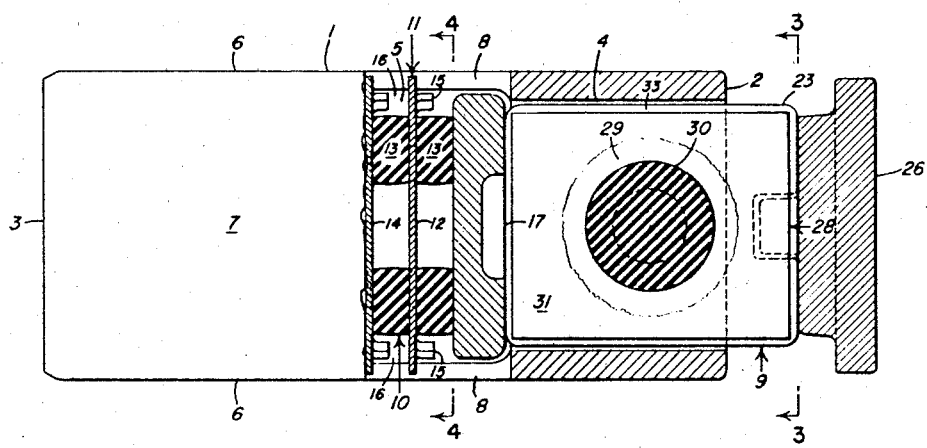
FIGURE 2 is a side elevational view with a part broken away and shown in a vertical section taken along lines 2—2 of FIGURE 1.
Figures 3, 4:
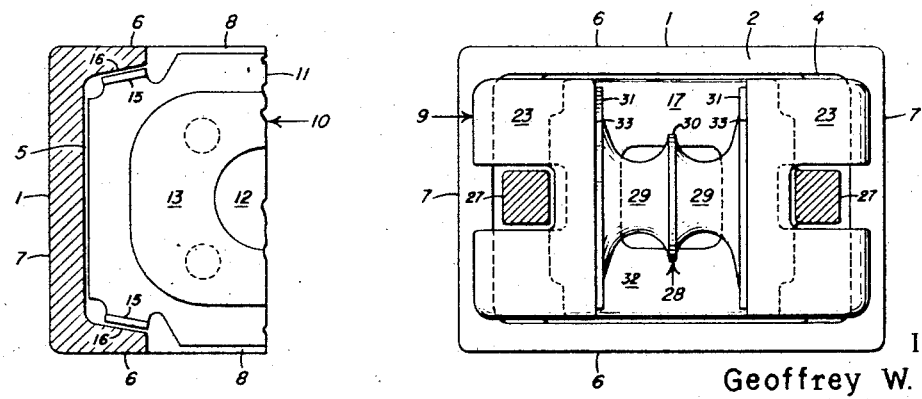
FIGURE 3 is a vertical sectional view taken along the line 3—3 of FIGURE 2.
FIGURE 4 is a fragmentary sectional view taken along lines 4—4 of FIGURE 2.

Referring now in detail to the drawings, in which like reference characters designate like parts, the improved friction-rubber draft gear of this invention is intended to fit in a draft gear pocket in an underframe of a railway car and is particularly designed to have a 3¼ in. travel and fit in a 24⅝ in. pocket, both A.A.R. standards for freight cars.

Possessing the earlier mentioned fundamentals of a friction-rubber type draft gear, the improved draft gear of this invention, in the form or embodiment in which it was given A.A.R. certification, is the same as the gear of the Suckow patent, save for the basic and critical difference over the gears that failed in the official tests that it uses polyurethane rubber as the rubber in its rubber cushioning unit. While sharing this difference with that form and generally resembling the Suckow gear structurally, the preferred embodiment illustrated in the drawings further improves on the Suckow gear in its friction cushioning unit in the particulars to be noted. As to these embodiments, the Suckow patent could be referred to for a description of the structure to the extent of the similarities. However, to minimize the bother, the similarities in structure, as well as the differences in structure and materials, will be described herein insofar as necessary to understand the invention.

The improved draft gear has a housing 1 which is open at at least its front end 2 and preferably closed at the rear by a rear wall 3. Interiorly, the housing 1 is divided into a front pocket 4 opening onto its front end 2 and a rear pocket 5 opening forwardly onto the front pocket and extending rearwardly to the rear wall 3. The housing 1 is generally rectangular in cross section and has as its horizontal and vertical sides pairs of longitudinally extending, laterally or transversely spaced walls, one pair, top and bottom walls 6 and the other, side walls 7. These longitudinal walls close or contain the pockets 4 and 5 at their sides except for preferred longitudinally extending apertures 8 interrupting and centered laterally on the top and bottom walls and opening laterally or transversely onto and substantially coterminus longitudinally with the rear pocket.

Arranged in tandem and acting in series and each received or seated in its respective pocket, are a friction or front cushioning unit 9 in the front pocket and a rubber or rear cushioning unit 10 in the rear pocket. The rubber cushioning unit 10 has a plurality of rubber spring units 11, each formed of a metal or like rigid separator plate 12 and a pair of generally ring or doughnut-shaped rubber pads 13 sandwiching and longitudinally spaced by and connected through the plate, and includes a plurality of metal or other rigid spacer plates 14 longitudinally spacing the spring units. While the rubber pads 13 are normally contained in the rear pocket 5, the spacer and separator plates 14 and 12 project or extend laterally or outwardly into the apertures 8 and, adjacent their corners, have longitudinally bent tabs 15 slideably engageable with longitudinally extending guideways 16 in the pocket adjacent sides of the apertures for guiding the plates in their longitudinal movement therein.

The rear pocket 5 also contains an intermediate or floating follower or follower block 17 which is positioned or disposed at the front of the rubber cushioning unit 10 and is inserted in advance thereof into the pocket through the housing's open front end 2. By contrast, the spring units 11 and spacer plates 14 are individually insertable into the rear pocket 5 through an access opening 18 in a side of the housing.

The front pocket 4 has at opposite sides forwardly flaring or diverging wedging or friction surfaces 19 formed on the side walls 7 and extending from the front end 2 rearwardly to lateral walls 20 which extend outwardly or outstand from the rear ends of the wedging surfaces and demark or define the rear end of the front pocket. Each of these rear walls 20 is interrupted centrally by a rearwardly and inwardly opening socket 21 bounded forwardly by a laterally extending stop or shoulder 22.

In the front pocket 4 and forming part of the friction or front cushioning unit 9 are a pair of opposed, transversely or laterally spaced wedges or friction shoes 23, each having an outer or outboard wedging face 24 bearing against or frictionally engaging one of the wedging surfaces 19 in the pocket. Lugs or toes 25 on the wedges 23 and centrally interrupting and laterally outstanding from the wedging faces 24, fit into the sockets 21 in the normal or expanded condition of the gear for limiting forward movement of the wedges. At the front of the wedges 23 is a front follower, follower block or plunger 26. If, as illustrated, the wedges 23 normally project forwardly from the front pocket 4 and the front follower 26 normally is disposed forwardly of the housing 1, the follower at that time may be connected to the housing by a dovetail interlock 27 with the wedges. Rubbing at their front ends against the follower block 26, the wedges 23 rub or bear at their rear ends against the confronting front end of the intermediate follower 17.

Similar in the above respects to the gear of the Suckow patent, the improved gear may and in the form certified by the A.A.R. does use for yieldably urging or forcing the wedges 23 apart laterally, the opposed packs of semi-elliptic leaf springs used as a wedge spring unit in that patent. However, in the preferred embodiment the improved gear has as its wedge spring unit a rubber spring unit, spring or mat 28. The preferred rubber wedge spring 28 has a pair of counterpart rubber pads 29 sandwiching and bonded or otherwise connected to a center or central plate 30 which may be a rigid metal plate but for ease of molding preferably is a rubber plate formed integrally with the pads. In turn, the pads 29 are sandwiched between a pair of metal or other rigid bearing plates 31, to one of which each pad is bonded or otherwise connected or fixed against relative movement. The rubber wedge spring 28 is contained in the space 32 of fixed length and variable width between the wedges 23 and the intermediate and front followers 17 and 26 and its plates 30 and 31 are flat or planer and parallel and disposed longitudinally of the housing 1. Each bearing plate 31 engages or contacts and bears against one of the flat or planer and parallel inner or confronting faces 33 sented by the wedges 23 to the wedge spring 28. These faces and the bearing plates are of substantially the same area for full bearing and also for minimizing relative transverse shifting to substantially fix the position of the spring relative to the wedges.

Since, in yieldably opposing rearward movement of the wedges 23 under longitudinal forces on the gear, the rubber pads 29 will be compressed laterally of the gear in a direction normal to the bearing plates 31 and caused to spread or flow in directions parallel to those plates, the initial or normal cross-sectional area of the pads necessarily will be sufficiently less than that of the space in which they are contained to accommodate the maximum spreading occurring at the gear's full travel. Accordingly, the cross-sectional area of the pads 29 will and the area of the center plate 30 may be less than the area of the bearing plates 31 and, as in the illustrated embodiment, both the pads and the separator plate conveniently may be circular in cross section.

In the foregoing description, the pads 13 of the rear cushioning unit 10 and those 29 and the preferred center plate 30 of the wedge spring 28 are termed rubber. However, as indicated earlier, the rubber of which the pads and plate are formed is and must be a particular rubber for the gear to operate as intended. The particular rubber is polyurethane rubber or elastomer, sometimes called urethane rubber. Polyurethane rubber is of three fundamental types depending on the base from which it is formulated. The types in terms of their bases are polyesters, polytetramethylene ether glycols and polypropylene glycols. Considerable information was available on the chemical and physical properties of polyurethane rubber, but there was no indication that it or any other natural or synthetic rubber, in place of the rubber used in the rubber cushioning units of the failed gears, would enable a gear of the structure of the Suckow gear to pass the official tests without somehow modifying that structure. The investigation, however, established that the polyurethane rubber was the key and that any of the three types in a suitable hardness, when used as the pads in the rubber cushioning unit and without any structural change from the Suckow gear, would produce an improved gear which more than meets the critical minimum capacities in A.A.R. specification M-901E-59 of 6,000 ft. lbs. at 1$\frac{5}{16}$ in. travel and 36,000 ft. lbs. at 500,000 lbs. reaction force. In fact, the average capacities of the improved gears that passed the official tests were as follows:

| Tests | Capacity, ft. lbs. | Travel, inches | Reaction force, 000 omitted |
|---|---|---|---|
| As-received capacity | 45,600 | 3.12 | 562 |
| Official capacity | 43,700 | 3.09 | 522 |
| Capacity at 1$\frac{5}{16}$" travel | 8,100 | 1.31 | 138 |
| Capacity at maximum travel | 52,100 | 3.31 | 711 |
| Capacity after endurance test at— | | | |
| Official rating travel | 48,600 | 3.10 | 659 |
| 500,000 lbs. R.F.L | 39,000 | 2.84 | 522 |
| Maximum travel | 57,800 | 3.30 | 774 |
| Capacity after sturdiness test at— | | | |
| Official rating travel | 45,900 | 3.11 | 577 |
| 500,000 lbs. R.F.L | 39,500 | 2.92 | 519 |
| Maximum travel | 55,000 | 3.32 | 796 |

As to suitable hardness, tests indicated that the Shore Durometer hardness of the polyurethane rubber in the rubber cushioning and wedge spring units 10 and 28 could be in a range on the order of about 90–110. Potentially, a higher hardness would give a higher capacity but the tests also showed the capacity of the gear to be substantially independent of the factors of shape and precompression of the rubber with rubber of around 90 hardness and quite responsive to those factors if the hardness was around 110. Thus, the preference will usually be for a hardness around the lower limit of the range as simplifying design and requiring less control over manufacturing tolerances.

As to resilience, tests showed the improved draft gear, with rubber only in the rubber cushioning unit 10 and that rubber the preferred polyurethane rubber, to have more than the minimum capacity of 36,000 ft. lbs. at 500,000 lbs. reaction force at −20° F. Also, while there was some variation in resilience, the reaction was substantially uniform over the range of from −40° F. to 175° F., which more than covers any possible operating range of the gear.

Prior to the present gear, it had been attempted in friction-rubber draft gears to use a rubber spring as the wedge spring, as well as the rear cushioning unit, but a stumbling block with the usual rubber was low temperature. To simulate the action of the conventional leaf wedge springs and obtain the desired capacity up to intermediate travel for which the friction cushioning unit is primarily responsible, required a very substantial precompression of the usual rubber and led to a corresponding reduction in its resiliency at the lower operating limit of around −30° F. In a rubber cushioning unit, such as the unit 10, in which the rear wall 3 or other follower against which the unit reacts is backed directly by stop lugs (not shown) at the adjoining ends of the draft gear pocket, this poses no particular problem. However, on the unbacked longitudinal walls of the housing against which the wedge spring reacts, the low temperature stiffness of a precompressed wedge spring of the usual rubber produced dangerous overstressing, with the result the attempt was abandoned.

By contrast with prior wedge springs, the rubber wedge spring 28 of the preferred embodiment not only can simulate the action of the leaf spring unit of the Suckow patent with a volume of rubber that is small relative to the space 32 in which the spring is contained, but also, as indicated by the concavity of the pads 29 in the normal condition of the gear, requires for the purpose very little precompression. The capacity of the spring varying with the volume of its rubber and there being ample space for a greater volume than that illustrated, the capacity of the preferred embodiment, with polyurethane rubber in both the wedge spring 28 and the rear cushioning unit 10, is potentially much higher at both intermediate and full travels than that of the certified embodiment in which only the rear cushioning unit has the rubber. Moreover, even if advantage is not taken of this potential increase in capacity, the preferred polyurethane rubber wedge spring 28 is better than the leaf spring unit of the Suckow patent in distributing its force fully over the wedges 23, instead of just at the ends, and so readily accommodating any force application with the front follower 26 canted or cocked out of its normal vertical disposition without damage to any part of the gear. A further advantage attendant the use of polyurethane rubber, and this applies to both the wedge spring and the rear cushioning unit, is the relative ease of assembly of the gear due to the relatively slight precompression that rubber requires to develop a load and have a substantially straight line force curve over the range of longitudinal forces to which the gear is subjectable in service.

From the above detailed description, it will be apparent that there has been provided an improved friction-rubber draft gear which, by using polyurethane rubber in its rear cushioning unit, more than meets the capacities required by the applicable A.A.R. specification and in the preferred embodiment in which the same rubber is used in a wedge spring, has potentially an even higher capacity. It should be understood that the described and disclosed embodiment is merely exemplary of the invention and that all modifications are intended to be included that do not depart from the spirit of the invention.

Having described our invention, we claim:

1. A friction-polyurethane rubber draft gear comprising a housing having an open front end, connected front and rear pockets in tandem in and opening toward said front end of said housing, a rear polyurethane rubber cushioning unit in said rear pocket and formed of a plurality of polyurethane rubber pads longitudinally spaced by metal plates and having a durometer hardness in the range of about 90–110, a front friction cushioning unit in said front pocket and including wedge means, said wedge means in normal extended position projecting through said open front and beyond said housing and being shiftable therefrom to a position within said housing inside said end to increase the normal length of said rear pocket and the capacity of said polyurethane rubber cushioning unit therein without corresponding decrease in the friction engenderable by said friction cushion unit, and means engaging the front end of said wedge means for shifting thereof to said second-named position under longitudinal forces on said draft gear.

2. A friction-rubber draft gear according to claim 1, wherein the friction cushioning unit includes as the wedge means a pair of transversely spaced wedges having wedging faces frictionally engaging wedging surfaces on opposite longitudinal walls of the housing, and a polyurethane rubber wedge spring unit acting between said wedges for yieldably urging said faces against said surfaces.

3. A friction-rubber draft gear according to claim 2, wherein the polyurethane rubber wedge spring unit includes a center plate, a pair of polyurethane rubber pads sandwiching and connected to said center plate, and a pair of metal bearing plates sandwiching and connected to said pads.

4. A friction-rubber draft gear according to claim 3, wherein the center plate is a polyurethane plate integral with the pads.

5. A friction-rubber draft gear according to claim 3, wherein the bearing plates of the spring unit are flat and parallel and bear against flat uninterrupted inner faces of substantially the same area on the wedges.

6. A friction-rubber draft gear according to claim 3, wherein the polyurethane rubber of the wedge spring unit has a durometer hardness in the range of about 90–110.

References Cited

UNITED STATES PATENTS

| | | | |
|---|---|---|---|
| 2,933,200 | 4/1960 | Quinn et al. | 213—22 |
| 2,982,536 | 5/1961 | Kordes | 267—1 |
| 3,138,264 | 6/1964 | Suckow | 213—30 |
| 3,227,288 | 1/1966 | Mulcahy et al. | 213—22 |

DRAYTON E. HOFFMAN, Primary Examiner

U.S. Cl. X.R.

213—34, 37, 38, 40